(12) United States Patent  
Sakamoto

(10) Patent No.: US 6,515,948 B1  
(45) Date of Patent: Feb. 4, 2003

(54) DATA RECORDING AND REPRODUCING APPARATUS

(75) Inventor: Tadahiko Sakamoto, Kawasaki (JP)

(73) Assignee: Denon, Ltd., Tokyo (JP)

( * ) Notice: Subject to any disclaimer, the term of this patent is extended or adjusted under 35 U.S.C. 154(b) by 221 days.

(21) Appl. No.: 09/645,581

(22) Filed: Aug. 25, 2000

(30) Foreign Application Priority Data

Aug. 26, 1999 (JP) .......................................... 11-239907

(51) Int. Cl.$^7$ ................................................ G11B 7/00
(52) U.S. Cl. ................. 369/47.32; 369/47.4; 369/53.31
(58) Field of Search ..................... 369/47.15, 47.23, 369/47.24, 47.3, 47.32, 47.33, 47.34, 47.29, 47.4, 47.43, 53.31, 53.36, 53.37, 53.29, 53.3

(56) References Cited

U.S. PATENT DOCUMENTS

| | | | | |
|---|---|---|---|---|
| 5,161,143 A | * | 11/1992 | Fukushima et al. | 369/53.45 |
| 5,400,309 A | * | 3/1995 | Satomura | 369/47.35 |
| 5,412,629 A | * | 5/1995 | Shirane | 369/47.4 |
| 5,535,186 A | * | 7/1996 | Ishizawa | 369/47.3 |
| 5,568,467 A | * | 10/1996 | Inagaki et al. | 369/47.4 |

FOREIGN PATENT DOCUMENTS

| | | |
|---|---|---|
| JP | 04114366 | 4/1992 |
| JP | 5-234252 | 9/1993 |
| JP | 0577368 | 1/1994 |
| JP | 07093902 | 4/1995 |

* cited by examiner

*Primary Examiner*—Thang V. Tran  
(74) *Attorney, Agent, or Firm*—Dickstein Shapiro Morin & Oshinsky LLP

(57) ABSTRACT

It is intended to prevent occurrence of rotation lock waiting times when a simultaneous recording and reproducing operation is performed on a disc-shaped recording medium according to the ZCLV scheme. In a period when audio data of one data block are input to a recording buffer at a constant rate via an A/D converter, another data block that was input immediately before is recorded on and reproduced from an optical disc. Audio data constituting the reproduced data block are temporarily stored in a reproduction buffer and then read out at the constant rate and output via a D/A converter. A system controller performs control so that data blocks are recorded on the optical disc successively. As for a data block that is recorded in two adjacent zones, the system controller performs control so that the same data block that is read from the recording buffer, rather than the data block that has been recorded on the optical disc, is reproduced.

2 Claims, 4 Drawing Sheets

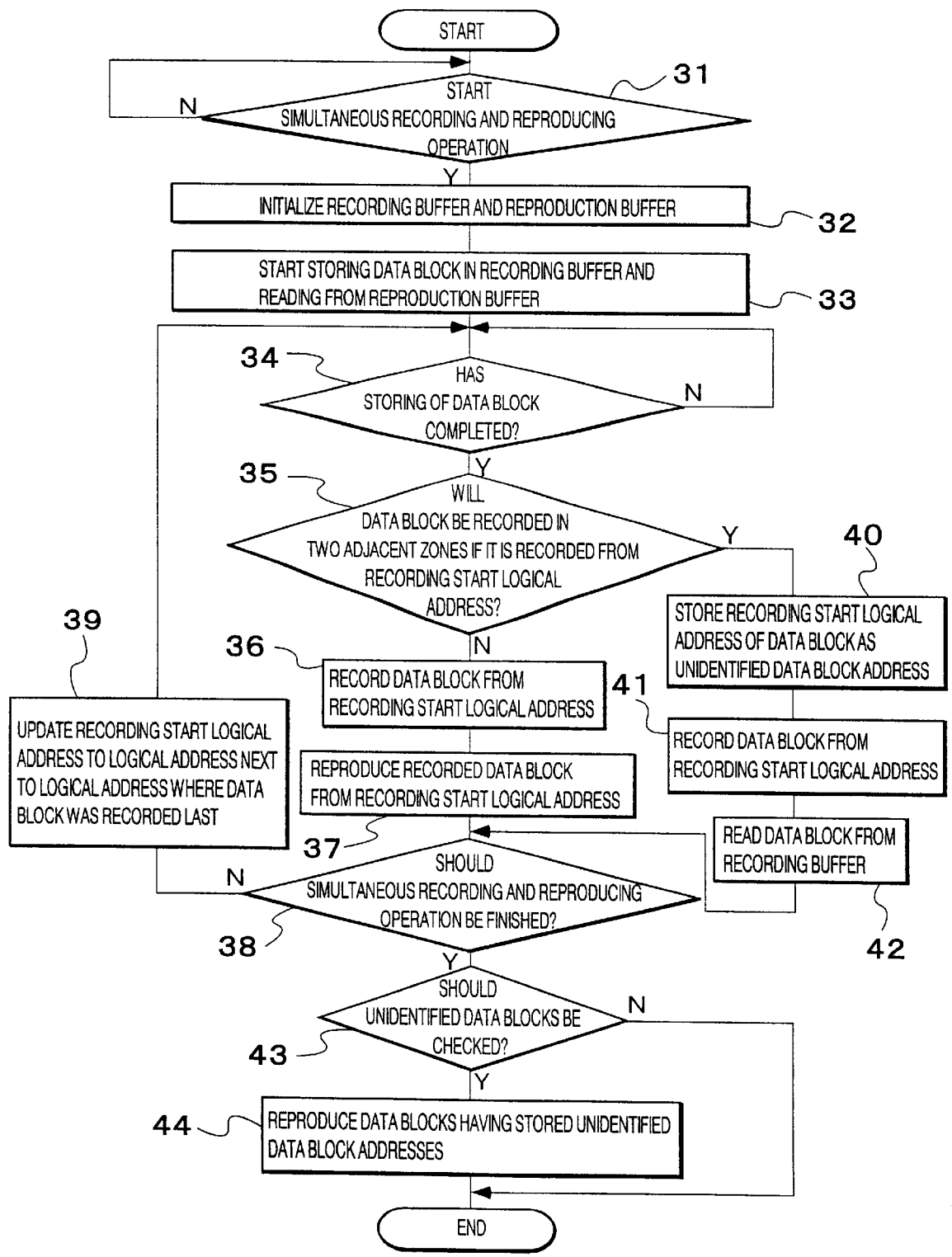

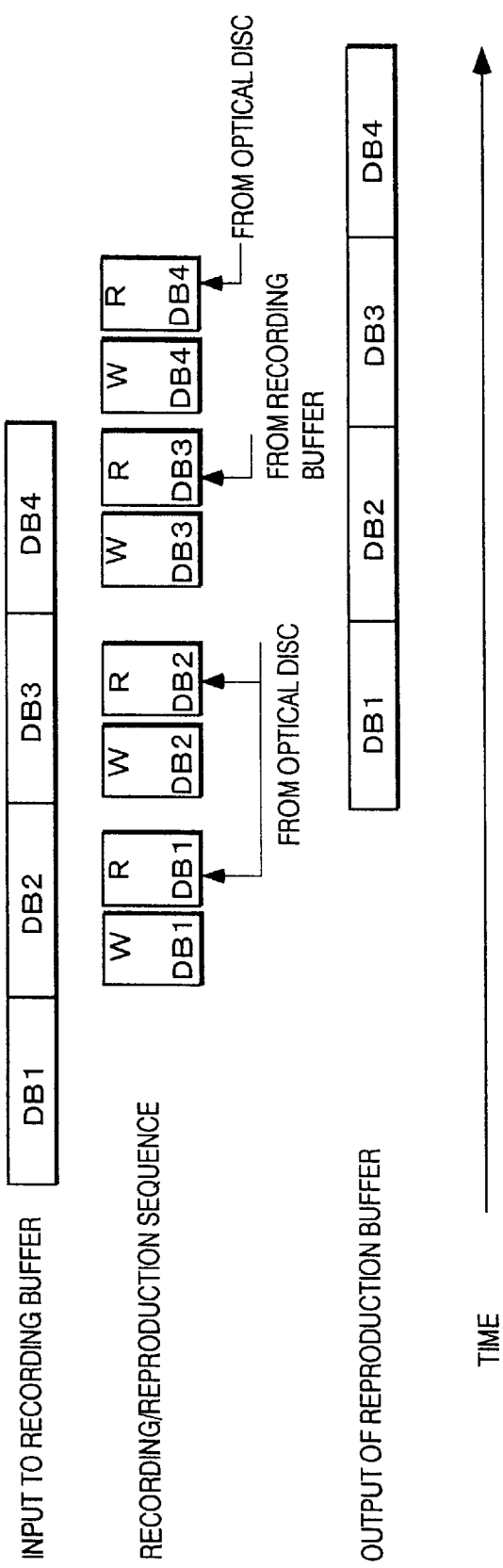

DATA RECORDING AND REPRODUCING APPARATUS

This invention claims a priority based on Japanese Patent Application No.11-239907 filed on Aug. 26, 1999, the entire contents of which are incorporated herein by reference for all purposes.

BACKGROUND OF THE INVENTION

The present invention relates to a data recording and reproducing apparatus which records and reproduces data on and from a disc-shaped recording medium according to the ZCLV (zoned constant linear velocity) scheme.

In the ZCLV scheme, the recording area of a disc-shaped recording medium is divided in the radial direction into a plurality of doughnut-shaped zones and data are recorded or reproduced at a constant linear velocity in each zone. The angular velocities of the respective zones are so set that a zone closer to the outer periphery has a lower angular velocity.

The ZCLV scheme can realize a simpler rotation control than the CLV scheme in which the angular velocity varies over the entire recording area of a disc-shaped recording medium, because in the ZCLV scheme the angular velocity is constant in each zone, that is, the angular velocity varies only in a zone-by-zone basis. Further, the ZCLV scheme can make the linear recording density more even and hence enables recording of more data on a recording medium than the CAV (constant angular velocity) scheme in which the angular velocity is constant over the entire recording area of a disc-shaped recording medium, because in the ZCLV scheme the angular velocities of the respective zones are so set that a zone closer to the outer periphery has a lower angular velocity though the angular velocity is constant in each zone.

Conventionally, the DVD-RAM (digital versatile disc-random access memory) that is a rewritable optical disc is known as an example of disc-shaped recording media on and from which data are recorded and reproduced according to the ZCLV scheme.

Incidentally, Japanese Unexamined Patent Publication No. Hei. 5-234252 discloses what is called a simultaneous recording and reproducing technique for reproducing recorded data from a disc-shaped recording medium while recording data on it.

In the simultaneous recording and reproducing technique of this publication, a single recording and reproducing head is used and data that are input at a constant rate are recorded on a disc-shaped recording medium in a shorter time than the data input period. A period in which no recording is performed is produced in a data input period in this manner, and recorded data are reproduced from the disc-shaped recording medium in the period thus produced. The reproduced data are elongated in time and output at a constant rate.

SUMMARY OF THE INVENTION

Where it is attempted to apply the simultaneous recording and reproducing technique of the publication No. Hei. 5-234252 to a disc-shaped recording medium on and from which data are recorded and reproduced according to the ZCLV scheme, the following problem arises.

Now, a unit for switching data between recording and reproduction is called "data block." In the ZCLV scheme, there may occur a case that one data block is recorded in two adjacent zones. In this case, since in the simultaneous recording and reproducing technique of the above publication recording of a data block and reproduction of a recorded data block are performed alternately, during recording of a data block a first change in angular velocity occurs when the recording and reproducing head is moved from a first zone where recording of the data block is stared to a second zone. A second change in angular velocity occurs when the recording and reproducing head is returned from the second zone to the first zone to reproduce the recorded data block. Further, a third change in angular velocity occurs when the recording and reproducing head is moved from the first zone to the second zone during reproduction of the data block.

Incidentally, when the angular velocity has been changed, there is a rotation lock waiting time when neither recording nor reproduction can be performed which is a time to wait for stabilization of the new angular velocity. Therefore, if the simultaneous recording and reproducing technique of the above publication is applied to the ZCLV scheme, it may be necessary to perform rotation lock waiting three times in addition to recording and reproducing of one data block during an input and output period of the one data block. As a result, the data input and output rate in a simultaneous recording and reproducing operation is lowered by an amount corresponding to three rotation lock waiting times.

An object of the present invention is to prevent occurrence of such rotation lock waiting times and thereby increase the data input and output rate in a simultaneous recording and reproducing operation in a data recording and reproducing apparatus which records and reproduces data on and from a disc-shaped recording medium according to the ZCLV scheme.

To attain the above object, the invention provides a data recording and reproducing apparatus which performs a simultaneous recording and reproducing operation in which, in an input period of data constituting one data block, another data block that was input immediately before is recorded on a disc-shaped recording medium on which recording and reproducing are performed according to a ZCLV scheme and the recorded one data block is reproduced, comprising reproducing means for reproducing a data block; and reproduction control means for controlling the reproducing means in a simultaneous recording and reproducing operation so that the reproducing means reads a data block that has been recorded on the disc-shaped recording medium so as not to extend over two ZCLV zones from the disc-shaped recording medium for reproducing it, and does not read a data block that has been recorded on the disc-shaped recording medium so as to extend over two ZCLV zones from the disc-shaped recording medium for reproducing it.

In the invention, a data block that has been recorded in two adjacent zones is not read from the disc-shaped recording medium for reproducing. As a result, no rotation lock waiting time occurs in reproducing one data block. A rotation lock waiting time occurs only once when the data block is recorded in a zone different from a zone in which the immediately preceding data block is recorded or when the data block is recorded in two adjacent zones. Therefore, the maximum time of the sum of rotation lock waiting times occurring in a simultaneous recording and reproducing operation of one data block is reduced, by two rotation lock waiting times, than the maximum time in the conventional case that is equal to the sum of three rotation lock waiting times. The data input or output rate in a simultaneous recording and reproducing operation can be made higher than in the conventional case by an amount corresponding to two rotation lock waiting times.

In the invention, there may be provided a buffer for holding, in the simultaneous recording and reproducing operation, a data block to be recorded on the disc-shaped recording medium, and the reproduction control means may control the reproducing means in the simultaneous recording and reproducing operation so that the reproducing means reads a data block that has been recorded on the disc-shaped recording medium so as not to extend over two ZCLV zones from the disc-shaped recording medium for reproducing it and reads a data block that has been recorded on the disc-shaped recording medium so as to extend over two ZCLV zones from the buffer for reproducing it, without reading it from the disc-shaped recording medium.

This makes it possible to prevent breaks of reproduction sound that would otherwise occur in a simultaneous recording and reproducing operation because data blocks that are recorded in two adjacent zones are not reproduced from the disc-shaped recording medium.

In the invention, there may be provided position storing means for storing a position on the disc-shaped recording medium of a data block that has been recorded on the disc-shaped recording medium so as to extend over two ZCLV zones in the simultaneous recording and reproducing operation. And the reproduction control means may control the reproducing means after completion of the simultaneous recording and reproducing operation so that the reproducing means reproduces the data block recorded on the disc-shaped recording medium at the position stored in the position storing means.

This makes it possible to check, after completion of a simultaneous recording and reproducing operation, whether data blocks that were recorded on two adjacent zones were properly recorded on the disc-shaped recording medium.

BRIEF DESCRIPTION OF THE DRAWINGS

FIG. 3 is a flowchart showing a simultaneous recording and reproducing operation according to the embodiment; and FIGS. 4A and 4B show an example of a simultaneous recording and reproducing operation according to the embodiment.

DETAILED DESCRIPTION OF THE PREFERRED EMBODIMENT

An embodiment of the present invention will be hereinafter described.

Figure 1:
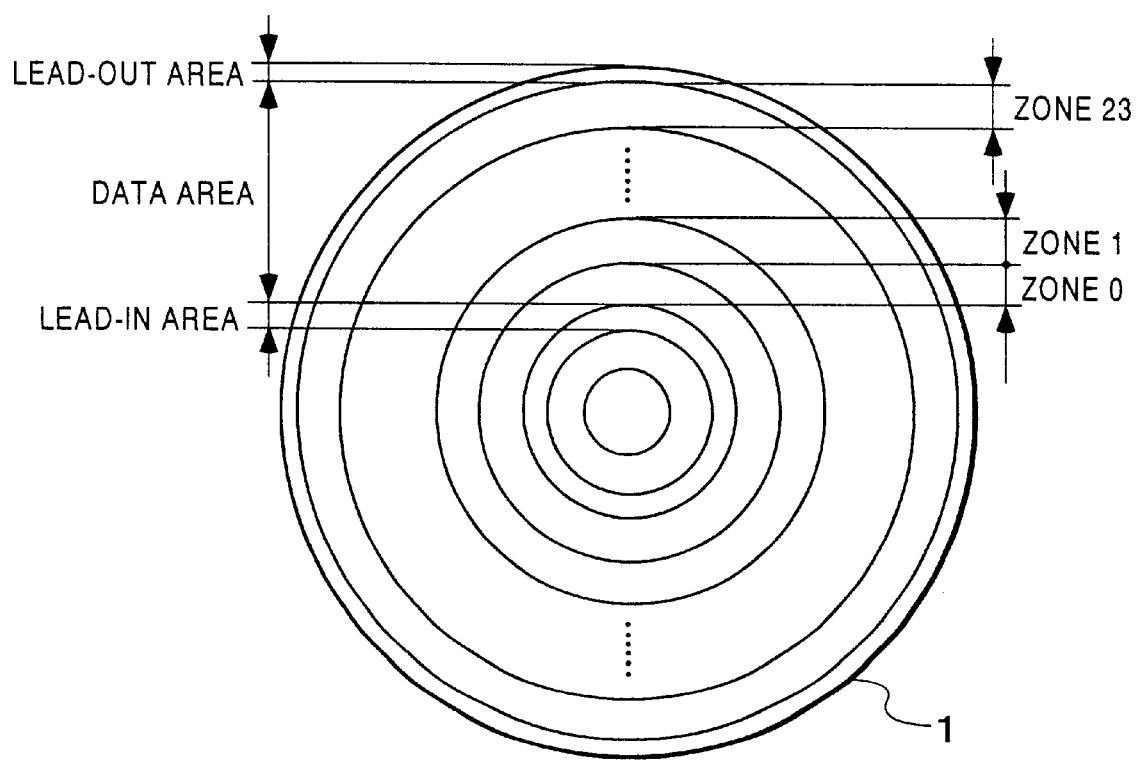
FIG. 1 shows a zone configuration of an optical disc on and from which data are recorded or reproduced according to the ZCLV scheme.

FIG. 1 shows a zone configuration of an optical disc 1 on and from which data are recorded and reproduced according to the ZCLV scheme and to which the embodiment is directed.

As shown in FIG. 1, in the optical disc 1, a data area provided between an innermost lead-in area and an outermost lead-out area is divided into 24 doughnut-shaped zones. Recording or reproduction in the zones is performed at different angular velocities. In each zone, recording or reproduction is performed at the same angular velocity. Since recording or reproduction is performed at a lower angular velocity in a zone closer to the outer periphery, the linear recording density is more even than in a case where recording or reproduction is performed at the same angular velocity in all zones. Each zone is provided with a plurality of sectors having the same length. A zone closer to the outer periphery has more sectors. A physical address that increases as the position goes outward is recorded at the head portion of each sector. The relationship between the physical addresses and the zones is fixed. Defect information consisting of, for example, information of regions (e.g., sectors) where a defect occurred or information of regions that replaced the regions where a defect occurred and defective regions is recorded in the lead-in area and the lead-out area. The relationship between the physical address and the logical address is predetermined so as to be defined uniquely according to the defect information. That is, the relationship between the physical address and the logical address is so determined that the physical address increases as the logical address increases in a case where there is no region where a defect occurred. However, where there exists a region where a defect occurred, only logical addresses that corresponded to the physical addresses of sectors belonging to the defective region are correlated again, according to the defect information, with the physical addresses of sectors belonging to a region that replaced the defective region. Basically, a defective region is replaced by a region belonging to the same zone as the defective region belongs to.

Figure 2:
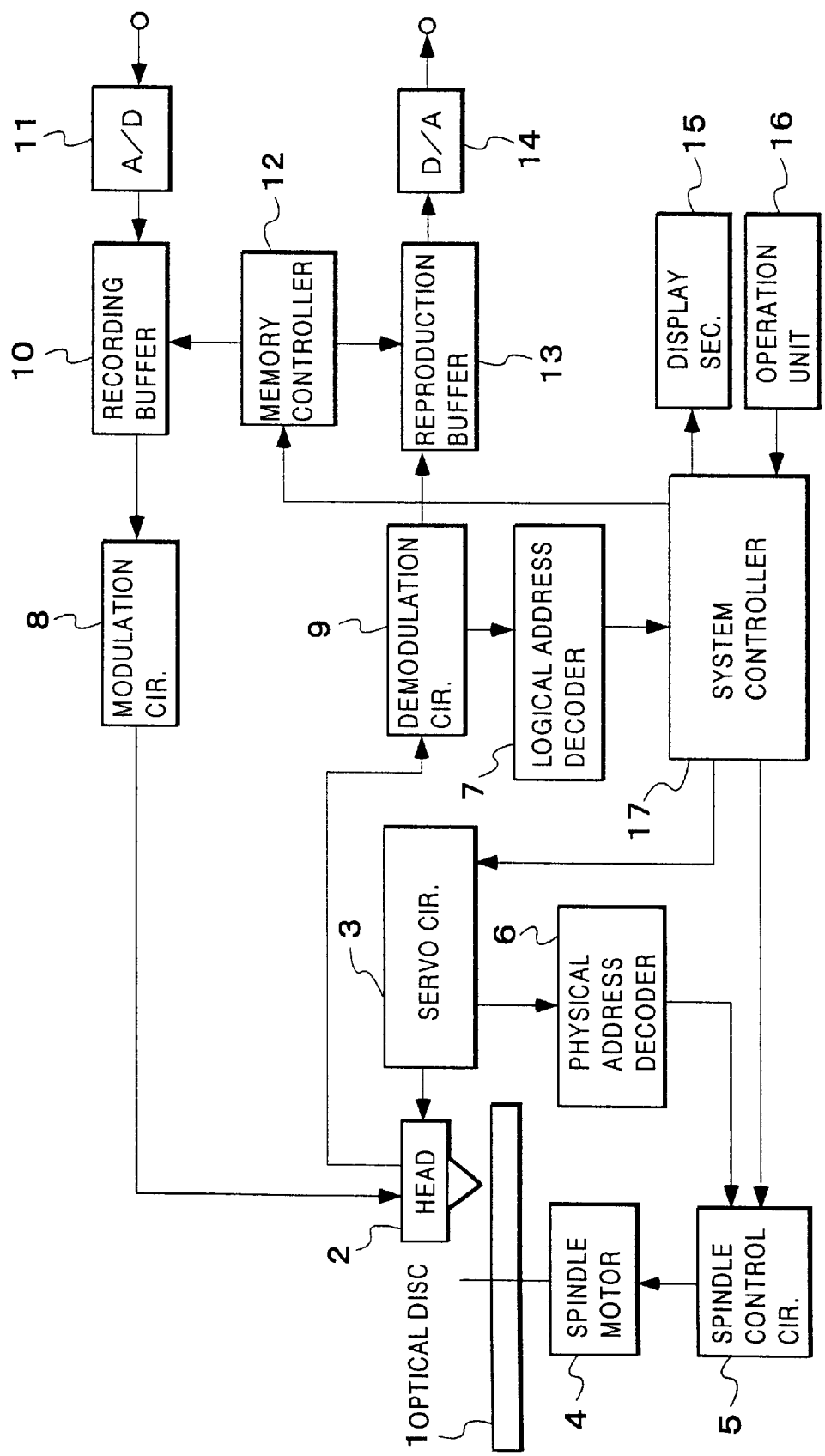
FIG. 2 is a block diagram showing a configuration of a data recording and reproducing apparatus according to an embodiment of the present invention.

FIG. 2 shows a configuration of a data recording and reproducing apparatus according to the embodiment.

In FIG. 2, a head 2 is an optical unit for recording and reproducing data on and from an optical disc 1 on which recording and reproducting are to be performed according to the ZCLV scheme. A servo circuit 3 moves the head 2 to a position according to an instruction from a system controller 17 and performs a focusing control and a tracking control on the head 2. A physical address decoder 6 receives, via the servo circuit 3, a signal that is read out by the head 2 and detects, from the signal, physical addresses that are recorded in advance on the optical disc 1. A spindle control circuit 5 recognizes a zone where the head 2 exists based on detection timing and values of the physical addresses, and performs control to rotate a spindle motor 4 at an angular velocity that is predetermined for each zone of the optical disc 1.

An audio signal that is input externally is converted by an A/D (analog-to-digital) converter 11 into digital audio data of a prescribed rate, which are stored in a recording buffer 10 by a memory controller 12 until data of a prescribed amount are stored. Then, digital audio data of the prescribed amount that are stored in the recording buffer 10 are read out as a data block and supplied to a modulation circuit 8, where a header including a logical address etc., a parity bit for error correction, and other information are added to the digital audio data and the resulting digital audio data are RLL (run-length limit) -modulated to limit the run-length. Examples of the run-length modulation are the 8–14 modulation that is used for CDs etc. and the 8–16 modulation that is used for DVDs. The RLL-modulated data block is recorded on the optical disc 1 by the head 2.

On the other hand, a data block reproduced from the optical disc 1 by the head 2 is demodulated by a demodulation circuit 9 into original digital audio data of the prescribed amount, which are caused by a memory controller 12 to be stored temporarily in a reproduction buffer 13 and then sequentially read out at the above-mentioned prescribed rate and are converted by a D/A (digital-to-analog) converter 14 into an analog audio signal, which is output.

A logical address decoder 7 receives and holds the defect information that is recorded on the optical disc 1 via the demodulation circuit 9, and converts physical addresses detected by the physical address decoder 6 into logical addresses.

The system controller 17 controls the servo circuit 3, the memory controller 12, the spindle control circuit 5, and other sections and thereby performs recording of digital audio data on the optical disc 1 and reproducting of digital audio data from the optical disc 1 alternately on a data block basis. In this manner, the system controller 17 performs a simultaneous recording and reproducing operation. In doing so, the system controller 17 performs control in such a manner that data blocks are recorded sequentially in such a direction that the logical address increases from a prescribed recording start logical address and a data block that has been recorded immediately before is reproduced, while referring to physical addresses detected by the physical address decoder 6 and the defect information held by the logical address decoder 7. Further, the system controller 17 controls the individual units when receiving an operation of a user that is input through an operation unit 16, as well as displays an operation status etc. on a display unit 15.

The simultaneous recording and reproducing operation of the above data recording and reproducing apparatus will be described below.

FIG. 3 shows a process that is executed by the system controller 17 in a simultaneous recording and reproducing operation.

As shown in FIG. 3, when start of a simultaneous recording and reproducing operation has been instructed by a user through the operation unit 16 at step S31, at step S32 the system controller 17 initializes the recording buffer 10 and the reproduction buffer 13 that are managed by the memory controller 12.

At step S33, the system controller 17 causes the memory controller 12 to start storing digital audio data in the recording buffer 10 and also causes the memory controller 12 to start storing digital audio data in the reproduction buffer 13 and reading the stored digital audio data at a constant rate.

If informed by the memory controller 12 at step S34 that storage of a data block in the recording buffer 10 has completed, at step S35 the system controller 17 judges, based on a recording start logical address and a size of the data block that are determined by referring to calculation results of the logical address decoder 7, whether the data block will be recorded in sectors including a sector belonging to a zone next to the zone to which the sector having the physical address corresponding to the recording start logical address belongs if the data block is recorded while the logical address is increased one by one from the recording start logical address. For example, a logical address designated by the user or the head logical address of unused regions is employed as the recording start logical address of the first data block.

If it is judged at step S35 that the data block that is stored in the recording buffer 10 will be recorded in no sectors belonging to the next zone, that is, the data block will not be recorded in two adjacent zones, at step S36 the system controller 17 causes the data of the data block to be recorded in such a manner that the logical address increases in order one by one from the recording start logical address of the data block. Specifically, the system controller 17 determines physical addresses corresponding to respective logical addresses by referring to calculation results of the logical address decoder 7 and controls the servo circuit 3 etc. so that the data of the data block are sequentially recorded at those physical addresses. When the recording of the data block has completed, at step S37 the system controller 17 causes the recorded data block to be reproduced from the recording start logical address.

On the other hand, if it is judged at step S35 that the data block will be recorded in a sector belonging to the next zone, that is, the data block will be recorded in two adjacent zones, the system controller 17 stores the recording start logical address as an unidentified data block address at step S40 and causes the data of the data block to be recorded in such a manner that the logical address increases in order one by one from the recording start logical address of the data block at step S41. When the recording of the data block has completed, at step S42 the system controller 17 causes reproduction of the data block by causing the memory controller 12 to transfer the recorded data block from the recording buffer 10 to the reproduction buffer 13. The capacity of the recording buffer 10 and the control sequence of the memory controller 12 are so determined that a data block is held by the recording buffer 10 until the data block is transferred from the recording buffer 10 to the reproduction buffer 13.

When the reproduction of the recorded data block has completed in the above manner, at step S38 the system controller 17 checks whether an instruction to finish the simultaneous recording and reproducing operation has been input by the user through the operation unit 16.

If it is judged at step S38 that no instruction to finish the simultaneous recording and reproducing operation has been input by the user, at step S39 the system controller 17 updates the recording start logical address to a logical address that is next to a logical address where the data block was recorded last. Then, the process returns to step S34 and an operation that is similar to the above will be performed for the next data block.

On the other hand, if it is judged at step S38 that an instruction to finish the simultaneous recording and reproducing operation has been input by the user and if at least one unidentified data block address is stored, at step S43 the system controller 17 accepts, through the operation unit 16, an instruction of the user as to whether to check the unidentified data block(s). If the system controller 17 has received an instruction to the effect that the unidentified data block(s) need not be checked, the system controller 17 clears the stored unidentified data block address(es) and the process is finished. On the other hand, if the system controller 17 has received an instruction to the effect that the unidentified data block(s) should be checked, at step S44 the system controller 17 sequentially employs the stored unidentified data block addresses as reproduction start logical addresses and causes a data block recorded on the optical disc 1 to be reproduced from each reproduction start logical address.

As a result of the execution of the above process, as exemplified in FIG. 4A, in a period when digital audio data of one data block DBi are input to the recording buffer 10 via the A/D converter 11, another data block DBi-1 that has been input to the recording buffer 10 immediately before is recorded on the optical disc 1 and reproduced from it. The reproduced data block DBi-1 is temporarily stored in the reproduction buffer 13 and then read out at the same rate as digital audio data are input to the recording buffer 10 and output via the D/A converter 14.

In the above operation, the data of each data block are sequentially recorded on the optical disc 1 in such a direction that the logical address increases. However, a data block that has been recorded in two adjacent zones such as a data block DB3 that has been recorded in two adjacent zones N and N+1 (see FIG. 4B) is reproduced by reading it from the recording buffer 10 rather than from the optical disc 1.

After completion of the simultaneous recording and reproducing operation, the data blocks that were recorded in two adjacent zones such as the data block DB3 that was recorded in the two adjacent zones N and N+1 (see FIG. 4B) are reproduced from the optical disc 1 in response to an instruction of the user.

As described above, in this embodiment, since data blocks that have been recorded in two adjacent zones are not read from the optical disk 1, no transition occurs between zones in reproducing one data block. As a result, no rotation lock waiting time occurs in reproducing one data block. Therefore, if overhead of modulation and demodulation is disregarded, in simple terms the maximum time that is required for a simultaneous recording and reproducing operation of one data block is equal to the sum of a time DBL/RRP necessary to record one data block that is determined by the rate RRP of recording or reproducing data on or from the optical disc 1 and the data block length, a time DBL/RRP necessary to reproduce the one data block that is determined in the same manner as the first-mentioned time DBL/RRP, one rotation lock waiting time TL that occurs when the one data block is recorded in a different zone than the immediately preceding data block or it is recorded in two adjacent zones, and two head movement waiting times TM each of which occurs when recording and reproduction are started.

Therefore, in this embodiment, satisfactory results are obtained if the data input and output time for a data block in a simultaneous recording and reproducing operation satisfies the following inequality:

$$DBL/RIO > 2 \times (DBL/RRP) + 3 \times TL + 2 \times TM$$

where RIO is the data input and output rate in the simultaneous reading and reproducing operation.

On the other hand, where three rotation lock waiting times occur as in the conventional case, in simple terms the maximum time that is required for a simultaneous recording and reproducing operation of one data block is equal to the sum of a time DBL/RRP necessary to record one data block that is determined by the rate RRP of recording or reproducing data on or from the optical disc 1 and the data block length, a time DBL/RRP necessary to reproduce the one data block that is determined in the same manner as the first-mentioned time DBL/RRP, three rotation waiting times TL that occur when the one data block is recorded in two adjacent zones, and two head movement waiting times TM each of which occurs when recording or reproduction is started.

Therefore, in the conventional case, the data input and output time for a data block in a simultaneous recording and reproducing operation needs to satisfy the following inequality:

$$DBL/RIO > 2 \times (DBL/RRP) + 3 \times TL + 2 \times TM$$

In conclusion, since in the embodiment a rotation lock waiting time occurs only once in a simultaneous recording and reproducing operation of a data block, in the embodiment the data input or output rate in a simultaneous recording and reproducing operation can be made higher, by an amount corresponding to two rotation lock waiting times, than in the conventional case where a rotation lock waiting time occurs three times.

Data blocks that were recorded in two adjacent zones, that is, data blocks that were reproduced from the recording buffer 10 rather than the optical disc 1 in a simultaneous recording and reproducing operation, are reproduced after completion of the simultaneous recording and reproducing operation. Therefore, a user can check whether the data blocks that were recorded in two adjacent zones were recorded properly on the optical disc 1.

The embodiment of the invention has been described above.

In the above embodiment, only data blocks that were recorded in two adjacent zones are reproduced after completion of a simultaneous recording and reproducing operation. However, this may result in a case that the reproduction time of a data block is too short to check. In this case, to facilitate a check by a user, instead of only a data block that was recorded in two adjacent zones, a plurality of consecutive data blocks including the data block concerned (e.g., the data block concerned and several data blocks located before and after the data block concerned) may be reproduced after completion of a simultaneous recording and reproducing operation.

In the embodiment, the data block that is a unit of switching between recording and reproducting may be the same as, for example, a correction data block that is a data unit for error detection and correction.

Although the embodiment is directed to the case where data to be recorded and reproduced are audio data, the invention can similarly be applied to any kinds of data that can be input at a rate that is lower than or equal to a constant rate as typified by various data such as video data that need to be input and output at a constant rate.

As described above, the invention can prevent occurrence of rotation lock waiting times and thereby increase the data input and output rate in a simultaneous recording and reproducing operation in a data recording and reproducing apparatus which records and reproduces data on and from a disc-shaped recording medium according to the ZCLV scheme.

What is claimed is:

1. A data recording and reproducing apparatus which performs a simultaneous recording and reproducing operation in which, during a data input period, other data that was input immediately before is recorded on a disc-shaped recording medium according to a ZCLV scheme and the recorded data is reproduced, said apparatus comprising:

a first memory which stores an inputted data block;

recording and reproducing means for recording the data block on said disc-shaped recording medium, and for reproducing the recorded data block from said recording medium;

a second memory which stores the reproduced data block; and control means for controlling operation of said recording and reproducing means and said first and second memories, and for determining, based on a recording start logical address on said medium and a data block size, whether or not the data block stored in said first memory will be recorded over two ZCLV zones, and wherein said control means is arranged such that, when said control means determines that the data block stored in said first memory will be recorded over two ZCLV zones, said control means controls said recording and reproducing means and said memories such that the data block stored in said first memory is recorded on said medium, and the data block stored in said first memory is transferred from said first memory to said second memory, and the data block transferred to said second memory is read and reproduced, and when said control means determines that the data block stored in said first memory will not be recorded over two ZCLV zones, said control means controls said recording and reproducing means such that the data block stored in said first memory is recorded on said medium, and the data block is reproduced from said medium.

2. A data recording and reproducing apparatus according to claim 1, further comprising position storing means for storing a position on the disc-shaped recording medium of the data block recorded over two ZCLV zones, and wherein the control means controls the recording and reproducing means, after completion of the simultaneous recording and reproducing operation, to reproduce the data block recorded at the stored position.

* * * * *